United States Patent [19]

Pitts, Jr.

[11] 4,189,705
[45] Feb. 19, 1980

[54] WELL LOGGING SYSTEM

[75] Inventor: Robert W. Pitts, Jr., Houston, Tex.

[73] Assignee: Texaco Inc., White Plains, N.Y.

[21] Appl. No.: 879,023

[22] Filed: Feb. 17, 1978

[51] Int. Cl.² .............................................. G01V 1/40
[52] U.S. Cl. ................................... 250/262; 340/854;
166/66; 175/50
[58] Field of Search .......... 340/18 NC, 18 CM, 18 P,
340/189 R, 203; 181/103; 166/113; 175/50;
73/152; 250/199, 262; 346/33 WL, 33 A

[56] References Cited

U.S. PATENT DOCUMENTS

| | | | |
|---|---|---|---|
| 3,820,063 | 6/1974 | Sexton | 340/18 NC |
| 3,905,010 | 9/1975 | Fitzpatrick | 340/189 R |
| 3,979,716 | 9/1976 | Pitts et al. | 340/18 R |
| 4,107,644 | 8/1978 | Howlett | 340/18 P |

OTHER PUBLICATIONS

Eppes et al., "Use Optical Fibers . . . Fiber Basics", 4/12/76, pp. 90–94, Electronic Design, vol. 24, #8.
Aoki et al., "Development of Optical Fiber . . . Power Co.", 5/77, pp. 181–188, Hitochi Review, vol. 26, #5.

*Primary Examiner*—Nelson Moskowitz
*Attorney, Agent, or Firm*—Robert A. Kulason; Carl G. Ries; Ronald G. Gillespie

[57] ABSTRACT

A well logging system includes a logging tool adapted to be passed through a borehole traversing an earth formation. The logging tool contains a sensor sensing a condition of the earth formation and providing electrical pulses corresponding in number and peak amplitude to the sensed condition. A first electrical pulse from the sensor occurring during each predetermined time period of a plurality of predetermined time periods, is stretched and then converted to parallel digital signals. A register receives the parallel digital signals and provides a serial digital signal in response to the shift pulses. A network provides an electrical synchronization pulse each time period prior to the occurrence of the shift pulses. A light emitting diode converts the synchronization pulses and the serial digital signals to corresponding light pulses. A cable including a fiber optic conductor transmits the light pulses uphole to the surface. Surface electronics includes a light-to-electrical converter for providing corresponding electrical pulses in accordance with the light pulses, so that the light-to-electrical converter provides a synchronization pulse followed by a serial digital signal each time period. Another circuit provides a set of shift pulses in response to the synchronizing pulse from the light-to-electrical converter, and an output circuit provides parallel output digital signals corresponding to the sensed condition in accordance with the shift pulses and the serial digital signals from the light-to-electrical converter.

6 Claims, 2 Drawing Figures

WELL LOGGING SYSTEM

BACKGROUND OF THE INVENTION

Field of the Invention

The present system relates to measuring systems in general and, more particularly, well logging systems.

SUMMARY OF THE INVENTION

A well logging system includes a logging tool adapted to be passed through a borehole traversing an earth formation. The logging tool includes a sensor sensing a condition of the earth formation and providing electrical pulses corresponding in number and peak amplitude to the sensed condition. A stretching circuit stretches the first electrical pulse from the sensor occurring during each predetermined time period of a plurality of predetermined time periods. An analog-to-digital converter converts each stretched pulse to parallel digital signals. A register converts the parallel digital signals to a serial digital signal in response to shift pulses from a shift pulse source. A pulse generator provides an electrical synchronization pulse each time period prior to the occurrence of the shift pulses. A light emitting diode converts the serial digital signals and the synchronization pulses to light pulses on a one for one basis, with the intensity of the light pulses corresponding to the amplitude of the pulse receiver by the light emitting diode. A cable having a fiber optic conductor transmits the light pulses uphole to the surface. Surface electronics includes a light-to-electrical converter means connected to the cable for providing electrical pulses on a one-for-one basis with the light pulses, each electrical pulse having an amplitude relative to the intensity of a corresponding light pulse so that the light-to-electrical converter means provides a synchronization pulse and a serial digital signal each time period. Another shift pulse source provides shift pulses to a second register receiving the serial digital signal so as to enter the serial digital signal into the second register. The second register provides parallel output digital signals corresponding to the sensed condition.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
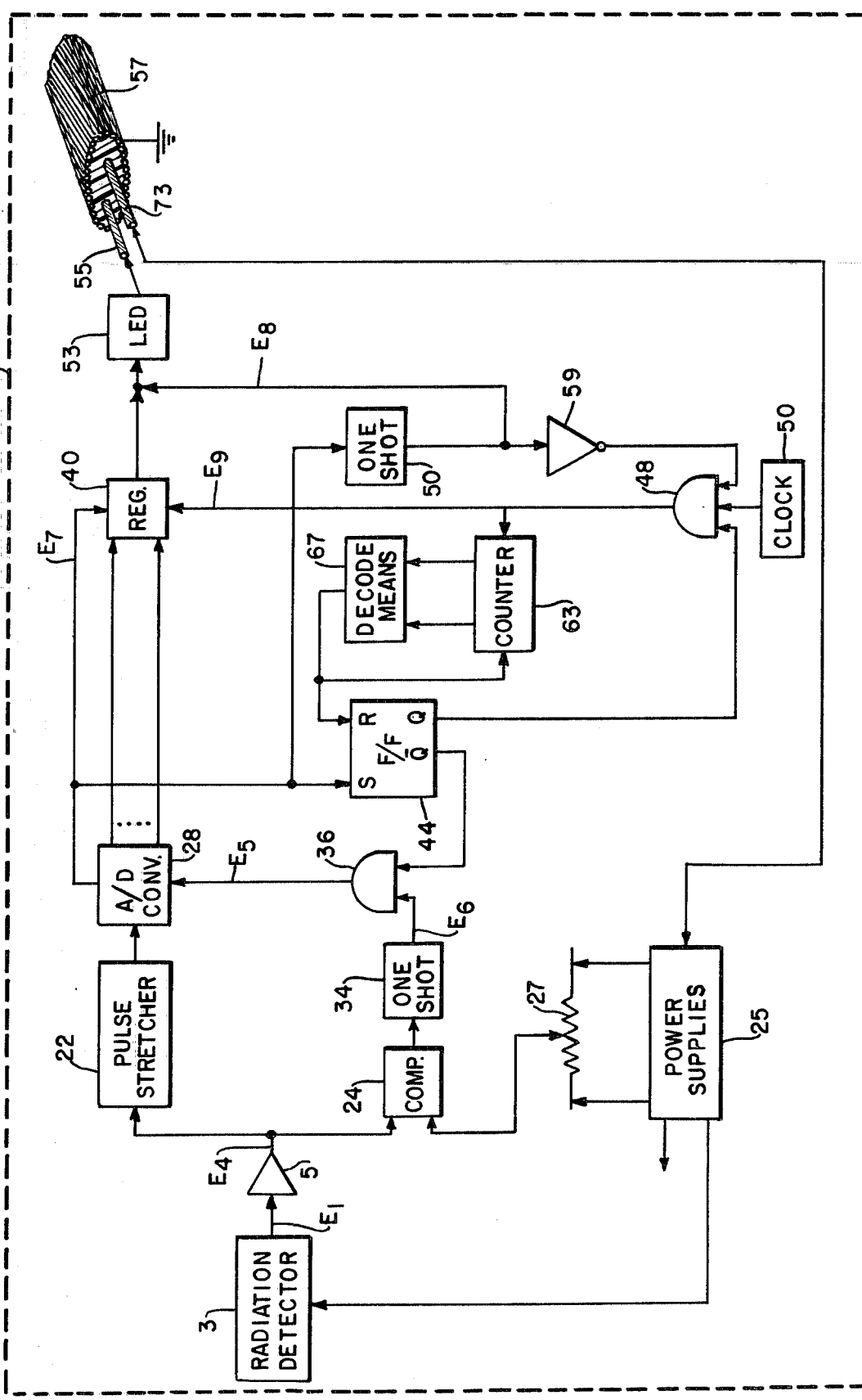
FIG. 1 is a simplified block diagram of a well logging instrument which is part of a well logging system, constructed in accordance with the present invention, for providing a record of a condition relative to an earth formation traversed by a borehole.

Referring to FIG. 1, radiation detector 3, which may be of a conventional type in sensing means 1, adapted to be passed through a borehole traversing an earth formation, detects gamma radiation and provide electrical data pulses $E_1$ corresponding in amplitude and number to detected gamma radiation emanating from the earth formation. The detected gamma radiation is relative to a condition of the earth formation into which sensing means 1 has been inserted. Data pulses $E_1$ are provided to a pre-amp 5.

Pre-amp 5 provides a pulse signal $E_4$ which is applied to a pulse stretcher 22 and to a comparator 24. Pulse stretcher 22 stretches the pulses in pulse signal $E_4$ and provides them to an analog-to-digital converter 28 which converts the stretch pulses into digital signals in response to a pulse $E_5$. Comparator 24 functions as a low level discriminator by comparing each pulse in pulse signal $E_4$ with a reference level. The level is obtained by applying reference voltages $+V$ and $-V$ from power supplier 25 across a potentiometer 27, and applying the wiper arm voltage to comparator 24. Adjustment of the wiper arm of potentiometer 27 sets the reference level. Comparator 24 provides a pulse when a pulse in pulse signal $E_4$ occurs which is greater than threshold value as defined by the voltage picked off of potentiometer 27. The pulse from comparator 24 triggers a one-shot multivibrator 34 which provides a pulse $E_6$ to an AND gate 36. AND gate 36 when enabled, as hereinafter explained, passes pulse $E_6$ to provide a pulse $E_5$ and when disabled blocks pulse $E_6$.

Analog-to-digital converter 28 provides digital signals to a register 40 corresponding to an acquired stretched pulse and upon completion of each conversion provides an end of conversion pulse $E_7$ to register 40, to a one-shot multivibrator 50 and to a set input of a flip-flop 44 having a reset input R and Q and $\bar{Q}$ outputs. The Q and $\bar{Q}$ outputs of flip-flop 44 are connected to AND gates 48 and 36, respectively. The voltages present at the Q and $\bar{Q}$ outputs of flip-flop 44 are at a high logic level and a low logic level, respectively, when flip-flop 44 is in a set state and at a low logic level and a high logic level, respectively, when flip-flop 44 is in a clear state. Pulse $E_7$ triggers flip-flop 44 to a set state causing the Q voltage to disable AND gate 36 until flip-flop 44 is reset as hereinafter explained.

The end of conversion pulse $E_7$ triggers one-shot 50 to provide a synchronization pulse $E_8$ to a light emitting diode 53, which provides a light pulse having an intensity corresponding to the amplitude of the synchronization pulse $E_8$, and to an inverter 59. Inverter 59 provides an inhibiting pulse to AND gate 48 also receiving clock pulses from a clock 60. Thus AND gate 48 is controlled by the Q output voltage from flip-flop 44 and the output from inverter 59 to control the passage of clock pulses from clock 60 so as to provide shift pulses $E_9$. Shift pulses $E_9$ are provided to register 40 and to a counter 63. The shift pulses shift out the content of register 40 as data pulses to light emitting diode 53 which will provide corresponding light pulses. Thus diode 53 provides light pulses corresponding to synchronization pulses and data pulses.

Each shift pulse is counted by a counter 63 which provides signals to decode means 67 in accordance with the count. Upon reaching a predetermined count decode means 67 provides a pulse output to input R of flip-flop means 44 and to counter 63, clearing them. Upon the resetting of flip-flop 44, AND gate 48 is disabled to prevent further shift pulses occurring and AND gate 36 is enabled to provide for the next conversion of a stretched pulse.

Light emitting diode 53 provides the light pulses to an optical conductor 55 in a cable 57. Cable 57 also has an electrical conductor 73 separated from the light conductor and from an outer armor 75. The outer armor of cable 57 is connected to ground.

Figure 2:
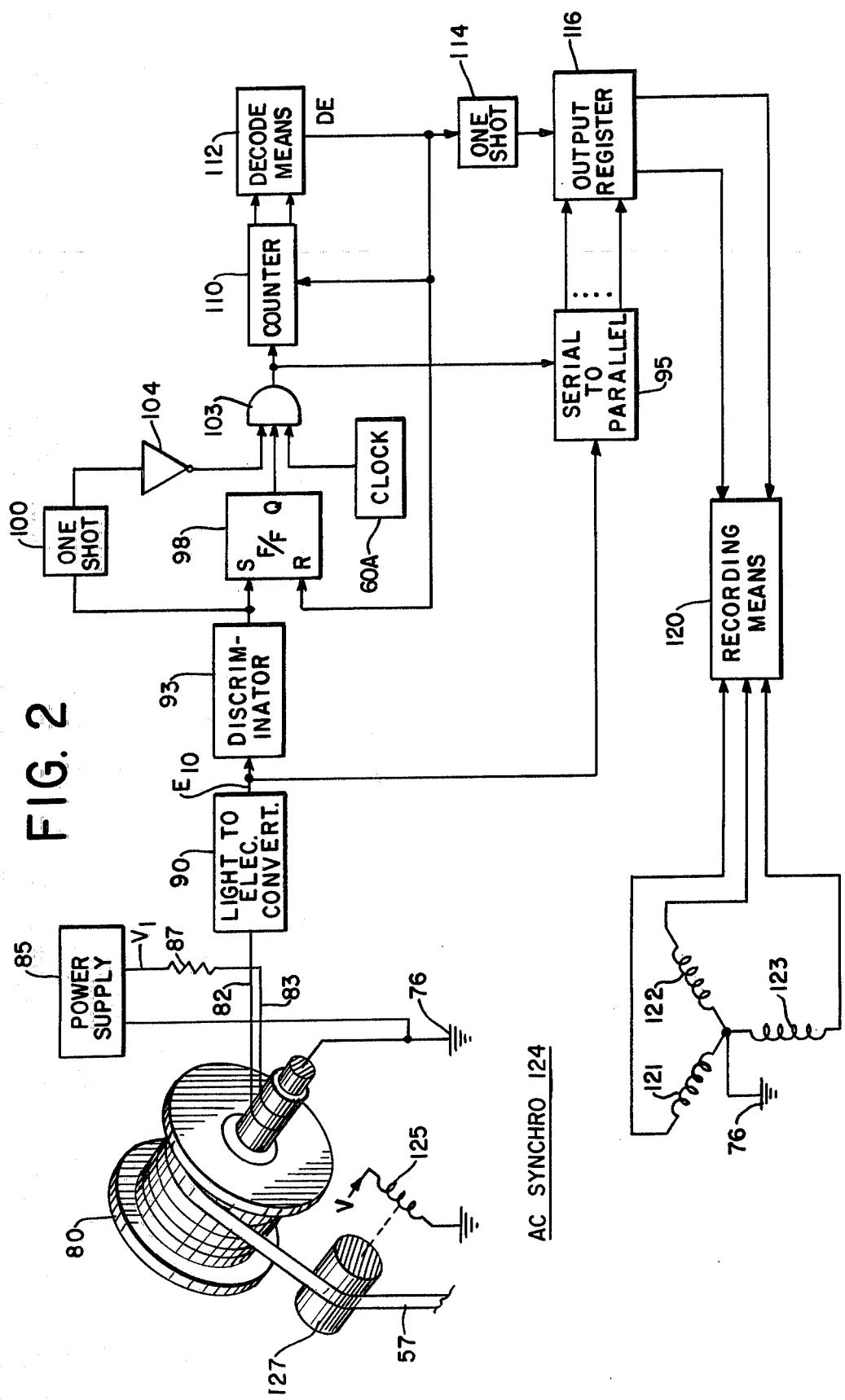
FIG. 2 is a simplified block diagram of surface electronics, which comprise the remainder of the well logging system, constructed in accordance with the present invention.

Referring to FIG. 2, cable 57 is contained on a reel 80 having a light conductor 55 and an electrical conductor 73 being connected to a light conductor 82 and an electrical conductor 83, respectively. A power supply 85 provides a voltage $V_1$ to a resistor 87 which is connected to electrical conductor 83. The power supply 85 is also connected to ground 76 so that the electrical conductor 73 and outer armor 57 has a direct current voltage across it which is provided to the power supplies 25 in sensing means 1. The light pulses provided by sensing means 1 and which are present on light conductor 82 are applied to a light to electrical converter 90 which may be a photodiode and which provides electrical pulses $E_{10}$ on a one for one basis with the light pulses. The amplitude of the pulses $E_{10}$ corresponds to the intensity of the light pulses provided to light to electrical converter 90. Since pulses $E_{10}$ corresponds to the light pulses conducted uphole, pulses $E_{10}$ will include synchronization pulses and data pulses. Pulses $E_{10}$ are applied to a discriminator 93 and to a serial to parallel register 95. Each synchronization pulse causes discriminator 93 to provide a pulse to a set input S of a flip-flop 98 having a reset input R and an output Q and to a one-shot multivibrator 100.

Each pulse provided by discriminator 93 sets flip-flop 98 so that it provides its Q output voltage at a high logic level to an AND gate 103. One-shot 100 provides a pulse which is inverted by an inverter 104 to provide an inhibiting pulse to AND gate 103. A clock 60A provides clock pulses at the same frequency as clock 60 provided its clock pulses in sensing means 1. Upon the termination of the inhibiting pulse, AND gate 103 passes the clock pulses as shift pulses to a counter 110 and to the serial to parallel register 95 causing it to shift in the data portion of pulses $E_{10}$.

Counter 110 provides signals corresponding to its content to the decode means 112 which provides a reset pulse upon counter 110 containing the predetermined count. The reset pulse from decode means 112 is applied to input R of flip-flop 98 and to a one-shot multivibrator 114. The reset pulse causes flip-flop 98 to provide its Q output voltage at a low logic level thereby disabling AND gate 103 to prevent further clock pulses from passing through.

One-shot 114 provides a pulse in response to the decode means pulse which is applied to an output register 116 causing register 116 to enter the parallel digital signals from serial to parallel register 95. Recording means 120 records the parallel digital signals provided by output register 116. Recording means 120 is controlled by signals from stator winding 121, 122 and 123 having a common connection to ground 76 of an AC synchro 124. Synchro 124 includes a rotor winding 125 receiving a voltage V and controlled by a wheel 127 over which passes cable 57. As cable 57 raises or lowers sensing means 1, wheel 127 turns accordingly, driving rotor winding 125 thereby causing the signals provided by stator windings 121, 122 and 123 to change accordingly and to control recording means 120.

The present invention as hereinbefore described is a well logging system in which a condition is sensed in a borehole traversing an earth formation and data pulses are provided corresponding in number and peak amplitude to the sensed condition. The pulses are then converted to digital signals and are then applied to a light emitting diode which converts them to light pulses on a one-for-one basis and corresponding in intensity to the amplitude of the electrical pulses. The light pulses are transmitted uphole where they are converted back to electrical pulses by a photodiode and applied to a register which provide parallel digital signals corresponding to the sensed condition in the borehole.

What is claimed is:

1. A well logging system comprising a logging tool adapted to be passed through a borehole traversing an earth formation including means for sensing a condition of the earth formation and providing electrical pulses corresponding in number and peak amplitude to the sensed condition; means connected to the sensing means for stretching the first electrical pulse from the sensing means occurring during each predetermined time period of a plurality of predetermined time periods; means connected to the pulse stretching means for converting each stretched pulse to parallel digital signals; means for providing shift pulses each time period; means for providing reset pulses; said shift pulse means includes clock means for providing clock pulses, an inverter connected to the second one-shot multivibrator for inverting the synchronization pulse to provide an inhibiting pulse, a second AND gate connected to the clock means, to the inverter and to the flip-flop and being controlled by a second control signal provided by the flip-flop at a high logic level upon being set and at a low logic level upon being reset so that said second AND gate passes the clock pulses from the clock means when the second control signal is at a high logic level and there is no inhibiting pulse and blocking the clock pulses when the control signal is at a low logic level or there is an inhibiting pulse so as to provide shift pulses, and counter means connected to the AND gate and to the reset pulse means for counting the pulses passed by the AND gate and providing signals corresponding to the count and being reset by the reset pulses, the reset pulse means includes decode means connected to the counter means for providing a reset pulse in accordance with the signals from the counter means when the count in the counter reaches a predetermined count; register means connected to the converting means and to the second AND gate in the shift pulse means for providing a serial digital signal in response to the shift pulses corresponding to the parallel digital signals; means for providing and electrical synchronization pulse each time period prior to the occurrence of the shift pulses; electrical-to-light converting means connected to the register means and to the synchronization pulse means for converting the synchronization pulses and the serial digital signals to light pulses on a one for one basis, with the intensity of the light pulses corresponding to the amplitudes of the pulses received by the electrical-to-light converging means; means connected to the electrical-to-light converting means for transmitting the light pulses uphole to the surface; and surface electronics including light-to-electrical converting means connected to the transmission means for providing electrical pulses on a one-for-one basis with the light pulses, each electrical pulse having an amplitude relative to the intensity of a corresponding light pulse so that the light-to-electrical converting means provides a synchronizing pulse followed by a serial digital signal each time period, second means connected to the light-to-electrical converting means for providing a set of shift pulses in response to each synchronizing pulse from the light-to-electrical converting means, and output means connected to the lightto-electrical converting means and to the second shift pulse means for providing parallel ouput digital signals corresponding to the sensed condition in accordance with the shift pulses from the second shift pulse means and the serial digital signals from the light-to-electrical converting means.

2. A system as described in claim 1 in which the electrical-to-light converting means is a light emitting diode and the light-to-electrical converting means is a photodiode.

3. A system as described in claim 2 in which the analog-to-digital converting means includes a comparator connected to the sensing means and receiving a reference voltage for providing an output at one logic level during the absence of pulses from the sensing means and at another logic level during the occurrence of a pulse from the sensing means, a one-shot multivibrator connected to the comparing means for providing a pulse when the output from the comparing means changes from the one logic level to the other logic level, an AND gate connected to the one-shot multivibrator and receiving a control signal for passing the pulse from the one-shot multivibrator when the control signal is at one logic level and for blocking the pulse from the one-shot multivibrator when the control signal is at another logic level, an analog-to-digital converter connected to the pulse stretching means and to the AND gate converts a stretched pulse from the pulse stretching means in response to the passage of a pulse by the AND gate to parallel digital signals corresponding to the stretched pulse and provides an "end of conversion" pulse and flip-flop means connected to the AND gate, to the analog-to-digital converter and to the reset pulse means for providing the control signal to the AND gate and being set by the end of conversion pulse from the analog-to-digital converter means so as to provide the control signal at the one logic level and being reset by a reset pulse so as to provide the control signal at the other logic level.

4. A system as described in claim 3 in which the synchronization pulse means is a second one-shot multivibrator connected to the analog-to-digital converter and providing a synchronization pulse in response to each "end of conversion" pulse.

5. A system as described in claim 4 in which the output means include discriminator means connected to the photodiode for providing a pulse in response to each light pulse developed from a corresponding synchronization pulse provided by the photodiode; means for providing clear pulses, second flip-flop means connected to the discriminator means to the clear pulse means and being set by pulses from the discriminator means and being reset to a clear state by the clear pulses for providing a third control signal at a high logic level while in the set state, and at a low logic level while in the clear state; second inhibiting means connected to the discriminator means for providing inhibiting pulses in response to pulses from the discriminator means; second clock means for providing clock pulses having the same frequency as the clock pulses provided by the first clock means; a third AND gate connected to the second clock means, to the second inhibiting means and to the second flip-flop means for passing the clock pulses from the second clock means as shift pulses to the output means when the third control signal is at a high logic level and the inhibiting pulses are absent, and for blocking the clock pulses from the second clock means so as not to provide shift pulses when the third control signal is at a low logic level or there is an inhibiting pulse from the second inhibiting means; and second counter means connected to the third AND gate for counting the shift pulses provided by the third AND gate and providing digital signals corresponding to the count; and the clear pulse means includes decode means connected to the second counter means for providing a clear pulse in accordance with the digital signals from the second counter means when the count in the second counter means corresponds to the predetermined count.

6. A system as described in claim 5 in which the shift pulse means further comprises a third one-shot multivibrator connected to the second decode means for providing a hold pulse in response to each clear pulse, and in which the output means includes means connected to the photodiode and to the third AND gate for converting the pulses provided by the photodiode corresponding to the non-synchronization pulses, to parallel digital signals in accordance with the shift pulses from the third AND gate; output register means connected to the third one-shot means and to the serial-to-parallel converting means for entering the parallel digital signals provided by the serial-to-parallel converting means in response to a hold pulse from the one-shot means and providing parallel digital signals in accordance with the entered digital signals from the serial-to-parallel converting means as the parallel output digital signals.

* * * * *